United States Patent
Orime et al.

(10) Patent No.: US 7,893,880 B2
(45) Date of Patent: Feb. 22, 2011

(54) ANTENNA INSTALLED ON RADAR

(75) Inventors: Nobutake Orime, Tokyo (JP); Naotaka Uchino, Tokyo (JP); Yoichi Iso, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 353 days.

(21) Appl. No.: 12/242,263

(22) Filed: Sep. 30, 2008

(65) Prior Publication Data
US 2009/0085827 A1 Apr. 2, 2009

(30) Foreign Application Priority Data
Oct. 2, 2007 (JP) .............................. 2007-258364

(51) Int. Cl.
*H01Q 1/38* (2006.01)
*H01Q 21/08* (2006.01)

(52) U.S. Cl. .............................. 343/700 MS; 343/824; 343/826; 343/829

(58) Field of Classification Search .......... 343/700 MS, 343/824, 825, 826, 829, 846
See application file for complete search history.

(56) References Cited

U.S. PATENT DOCUMENTS

| 6,335,704 | B1 * | 1/2002 | Nakamura | 343/700 MS |
| 6,919,843 | B2 * | 7/2005 | Tsai et al. | 343/700 MS |
| 7,339,535 | B2 * | 3/2008 | Liang et al. | 343/702 |
| 7,623,073 | B2 * | 11/2009 | Teshirogi et al. | 343/700 MS |

FOREIGN PATENT DOCUMENTS

JP 2006258762 9/2006

* cited by examiner

*Primary Examiner*—Hoang V Nguyen
(74) *Attorney, Agent, or Firm*—Turocy & Watson, LLP

(57) ABSTRACT

Disclosed is an antenna for a radar device which is available for angle measuring in a wide angle for both of the right and the left directions from a travelling direction of a vehicle.
SOLUTION: An antenna for radar device 100 comprises an antenna unit 110 as a combination of one of antenna elements 102 and one of second bottom boards 103, wherein a plurality thereof are arrayed on a first bottom board 101. The antenna element 102 is bent as L-shaped, one end thereof is opened, another end thereof penetrates the first bottom board 101 as noncontact therewith, and is connected to a transmission line 104 with further penetrating a line substrate 105.

20 Claims, 10 Drawing Sheets

US 7,893,880 B2

ANTENNA INSTALLED ON RADAR

TECHNICAL FIELD

The present invention relates to an antenna to be used for a radar device for vehicle use, and specifically to a technical field of an antenna installed on a radar having a directionality of wide angle.

BACKGROUND ART

Among the heretofore known antennas, a half-wave dipole antenna is known as the antenna having the lowest directionality, or nondirectional in a way. Such half-wave dipole antenna is the antenna to be formed by arranging two antenna elements of linear shape in one straight line. And then it becomes an antenna pattern having a gain of doughnut shape in a direction orthogonal to such antenna element.

Moreover, as an antenna similar to the half-wave dipole antenna, a quarter-wave monopole antenna is known as well, which is formed by an arrangement using only either piece of the two antenna elements of the dipole on an electrically conductive board (a bottom board). According to such quarter-wave monopole antenna, it is possible to obtain a mirror image of the antenna element at a position symmetrical to the electrically conductive board, which has the length of one quarter wavelength and is arranged on the electrically conductive board. And then in a case where the electrically conductive board is assumed to be broadened infinitely, it is possible to obtain characteristics completely similar to that of the half-wave dipole antenna due to the quarter-wave monopole antenna and the mirror image thereof.

Such dipole antenna or monopole antenna is widely used conventionally as a nondirectional antenna. For example, the monopole antenna is used as an antenna on a roof of a vehicle, and as an antenna for a portable telephone. Moreover, as a type of monopole antenna to be used in actual circumstances, the one that is widely used, for example, has a structure wherein a central conductor of a coaxial line is used as an antenna element, and an outer conductor is connected to a bottom board.

While, as a radar device to be mounted on a vehicle and for detecting an obstacle or the like in a travelling direction thereof, one type is heretofore known, wherein a plurality of antennas are arrayed, and then an azimuth of the obstacle or the like is measured. For example, according to an antenna for radar device 900 as shown in FIG. 10, which is disclosed in patent document 1, there is disclosed an antenna to detect an azimuth of an obstacle by using an array antenna, which is formed by arraying a plurality of antenna units 902 on a bottom board 903, wherein an antenna element 901 is formed in a helical manner individually.

[Patent Document 1] Japanese Patent Application Publication No. 2006-258762

DISCLOSURE OF THE INVENTION

Technical Problem

However, according to the antenna disclosed in patent document 1, the directionality is so strong that it is possible to measure the azimuth only in a limited angle range (approximately ±30 degrees for example) centering around a direction vertical to a plane of the antenna. And then there are problems, such as a so-called narrow angle measuring coverage or the like. For widening the range of an angle measurement (the angle measuring), it is desirable to use an antenna having a wide directionality, however, in a case where the dipole antenna or the monopole antenna is used, it is not able to specify a direction in this case due to its non-directionality.

Here, the present invention has been made to overcome the above mentioned problems, and it is an object of the present invention to provide an antenna for a radar device available for angle measuring in a wide angle, by widening a directionality of an antenna element and of an array wherein the antenna elements are arrayed.

Technical Solution

A first aspect of an antenna for a radar device according to the present invention is characterized in that it comprises: a first bottom board having a planar shape; a second bottom board to be electrically conducted on a surface of one side of the first bottom board and to be provided with standing in a direction approximately vertical thereto; and an antenna element having a linear shape arranged in a direction parallel to the first bottom board with spacing a predetermined distance of d1 therefrom, and arranged at a predetermined position to be approximately vertical to the second bottom board, wherein it is formed with a length between the second bottom board and a tip of the antenna element to be approximately a $\lambda/4$ in a case where a wavelength of a transmitting and receiving electric wave is assumed as $\lambda$.

Another aspect of the antenna for a radar device according to the present invention is characterized in that the antenna element and the second bottom board form one unit, two of the antennas individually comprised of the one unite are arrayed on a similar plane or a similar curved surface of the first bottom board, and a $D/\lambda<0.5$ in a case where a distance between the two antennas is assumed as D.

Another aspect of the antenna for a radar device according to the present invention is characterized in that a plurality of the single units are arranged to be an array form.

Another aspect of the antenna for a radar device according to the present invention is characterized in that a transmission line is provided at another surface of the first bottom board, and the antenna element is connected to the transmission line with being bent toward the first bottom board side to be in a direction parallel thereto in a vicinity of the second bottom board.

Another aspect of the antenna for a radar device according to the present invention is characterized in that a transmission line is provided at the second bottom board side, and the antenna element is connected to the transmission line.

Another aspect of the antenna for a radar device according to the present invention is characterized in that the distance d1 is approximately equal to the $\lambda/4$.

Another aspect of the antenna for a radar device according to the present invention is characterized in that the second bottom board has a planar shape or a curved surface to be provided with standing in a direction approximately vertical onto the first bottom board.

Another aspect of the antenna for a radar device according to the present invention is characterized in that a height of the second bottom board in the direction approximately vertical to the first bottom board is determined to be available to measure an elevation angle till a predetermined degree for the first bottom board as a horizontal plane on a plane vertical to the first bottom board and including the antenna element.

Another aspect of the antenna for a radar device according to the present invention is characterized in that the antenna element is formed by being printed on a top surface of a dielectric substance mounted and set on the first bottom board, and the second bottom board is formed by metal plating an inner surface of a hole formed at the dielectric substance.

Effect of the Invention

As above described, according to the present invention, it becomes possible to provide an antenna for a radar device available for angle measuring in a wide angle by arranging two bottom boards orthogonal to a monopole antenna. Moreover, in a case of setting an array interval of antenna elements to be as a predetermined range, it becomes possible to provide an antenna for radar device having a directionality of wide angle with preventing from an influence of an interference of a receiving signal.

DESCRIPTION OF THE REFERENCE SYMBOLS

| 100, 900 | ANTENNA FOR RADAR DEVICE |
| --- | --- |
| 101 | FIRST BOTTOM BOARD |
| 102, 402, 901 | ANTENNA ELEMENT |
| 102a | RADIATION PART |
| 102b | POWER FEEDING PART |
| 103, 203, 303, 411, 421 | SECOND BOTTOM BOARD |
| 104 | TRANSMISSION LINE |
| 105 | LINE SUBSTRATE |
| 110, 400, 410, 420, 902 | ANTENNA UNIT |
| 403 | DIELECTRIC SUBSTANCE |
| 404, 412 | THROUGH HOLE |
| 422 | PENETRATED PART |

BEST MODE FOR INVENTION

An antenna for a radar device according to preferred embodiments regarding the present invention will be described in detail below, with reference to drawings. Here, each component part having a similar function is designated by the similar symbol for simplifying a drawing and a description.

The First Embodiment

Figure 1:
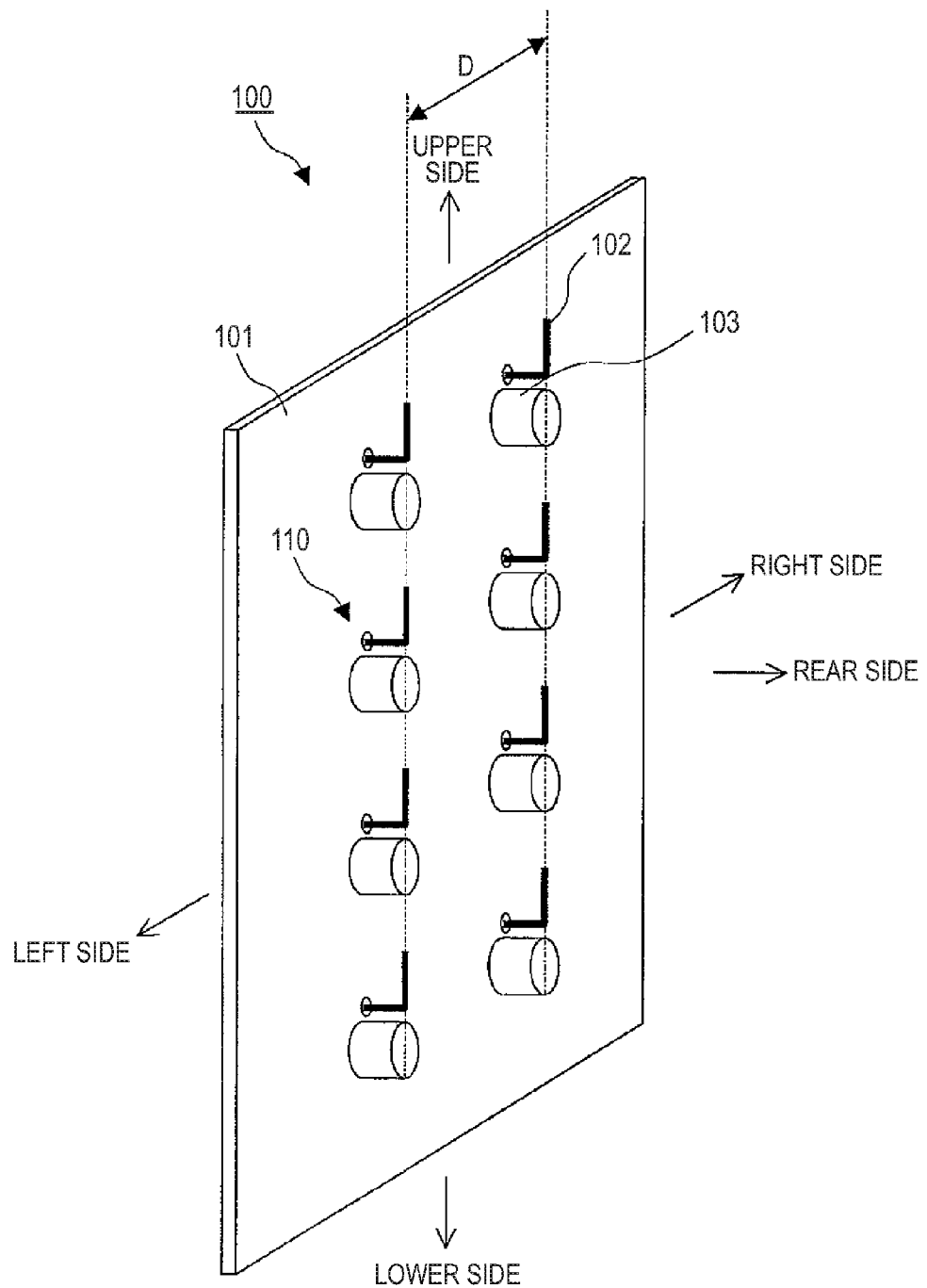
FIG. 1 is a diagrammatic perspective view of an antenna for a radar device according to the first embodiment regarding the present invention.
Figure 2:
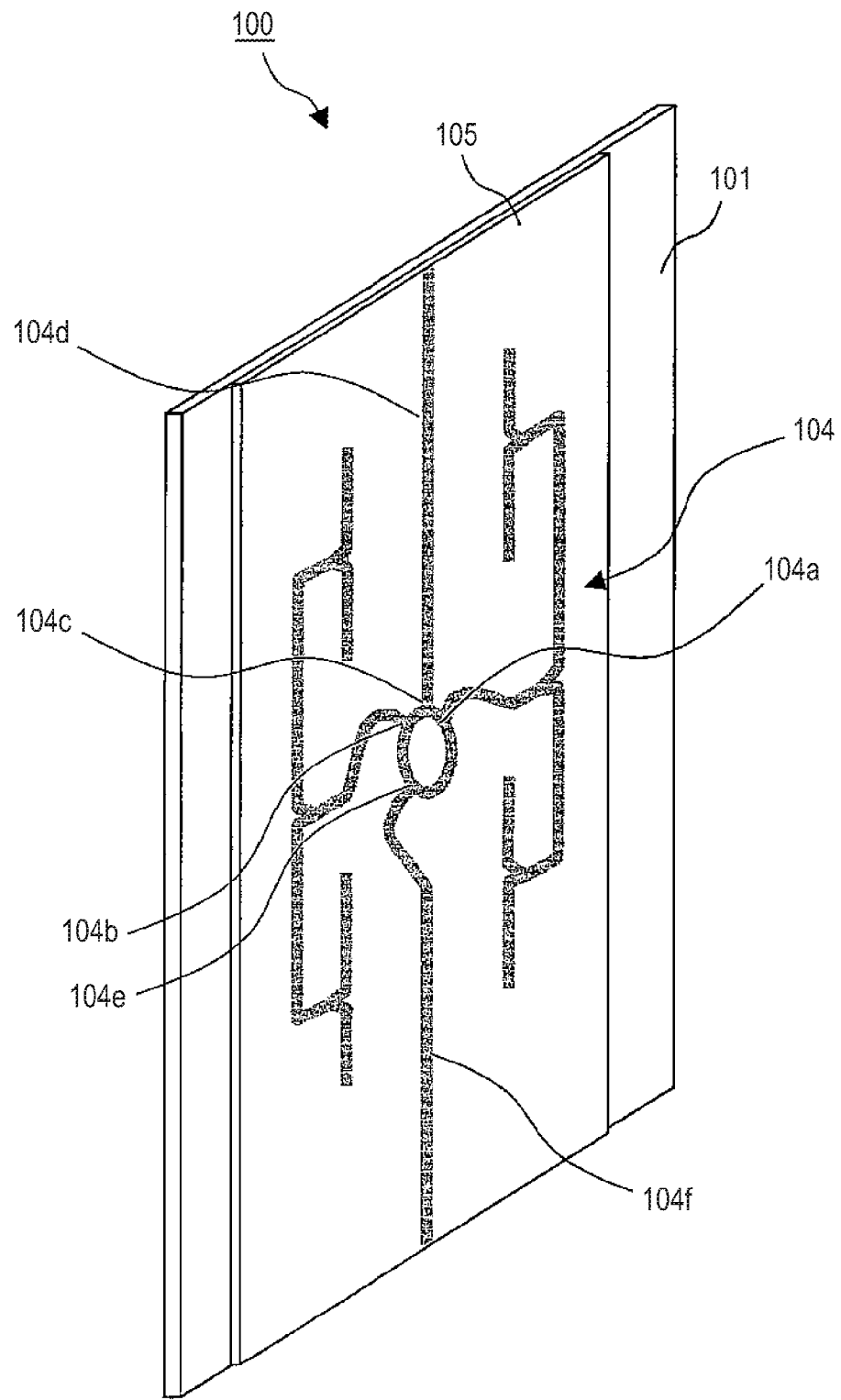
FIG. 2 is a diagrammatic perspective view of another surface of an antenna for a radar device according to the first embodiment regarding the present invention.

A diagrammatic perspective view of an antenna for a radar device according to the first embodiment regarding the present invention is shown in FIG. 1 and FIG. 2. FIG. 1 is a diagrammatic perspective view of a radiation side as one surface of an antenna for radar device 100 according to the present embodiment, and FIG. 2 is a diagrammatic perspective view of another surface as an opposite side to the radiation side. The one surface of an antenna for radar device 100 is comprised of an antenna element 102 and a second bottom board 103 as one pair and then by arraying a plurality thereof onto a first bottom board 101. Moreover, the second bottom board 103 is electrically connected to the first bottom board 101.

Further, a transmission line 104 is formed on a line substrate 105 at the other surface of the antenna for radar device 100, which is connected to the individual antenna elements 102. Still further, the transmission line 104 forms a microstrip line, with the first bottom board 101 and the line substrate 105.

Still further, according to the antenna for radar device 100 as shown in FIG. 1, an upper side of the first bottom board becomes a roof side of a vehicle, a lower side becomes a wheel side thereof, and a right side in the figure becomes a rear side of the vehicle. Here, according to the present embodiment, it is assumed that an electric wave is radiated from individual antenna elements 102 to the rear side of the vehicle. Furthermore, the antenna elements 102 as one pair and the second bottom board 103 are arranged as two pairs in a horizontal direction, meanwhile, four pairs thereof are arranged in a height direction.

According to the present embodiment, a phase comparison monopulse method is to be used for performing a measurement of an azimuth in a horizontal direction regarding an object existing at the rear side of the vehicle. Moreover, regarding the phase comparison monopulse method, a shift angle from a direction vertical to a plane of an antenna is evaluated, based on each of receiving signals received at two antennas arranged in the horizontal direction, and then by fitting a value, of which a difference signal between such the two signals is standardized by a sum signal thereof, with a Diffri curve (a monopulse curve) set beforehand. Further, according to the present embodiment, a sum total of the receiving signals at the four antenna elements 102 arranged in the height direction is evaluated for a left side and a right side thereof respectively. And then by evaluating the sum and the difference for such the both values based thereon, the measurement of the azimuth is performed using the phase comparison monopulse method.

More specifically, the sum total of the receiving signals at the four antennas 102 at the left side in FIG. 1 is output to a power splitter 104a on the transmission line 104 as shown in FIG. 2, meanwhile, the sum total of the receiving signals at the four antennas 102 at the right side is output to a power splitter 104b on the transmission line 104. Moreover, a power splitter 104c is formed for line lengths to be equivalent between the line from the power splitter 104a to the power splitter 104c and the line from the power splitter 104b to the power splitter 104c. Further, a sum signal of the sum total of the receiving signals at the four antennas 102 at the right side and the sum total of the receiving signals at the four antennas 102 at the left side is output from an output line 104*d* connected to the power splitter 104*c*.

While, a difference corresponding to a phase difference of 180 degrees is set using a line length from the power splitter 104*a* to a power splitter 104*e* and a line length from the power splitter 104*b* to the power splitter 104*e*. And then a difference signal between the sum total of the receiving signals at the four antennas 102 at the right side and the sum total of the receiving signals at the four antennas 102 at the left side is output from an output line 104*f* connected to the power splitter 104*e*.

According to the antenna for radar device 100 regarding the present embodiment, it becomes possible to realize an antenna available for measuring in a wide angle range toward both of the right and the left directions from a rear side of a vehicle, by using the antenna element 102 and the second bottom board 102 as shown in FIG. 1 (hereinafter, an angle range available for measuring is referred to as a coverage). Moreover, a combination of the first bottom board 101, one of the antenna elements 102 and the second bottom board 103 is referred to as an antenna unit 110 of the antenna for radar device 100 hereinafter. And then an operation of the antenna unit 110 will be described in detail below.

Figure 3:
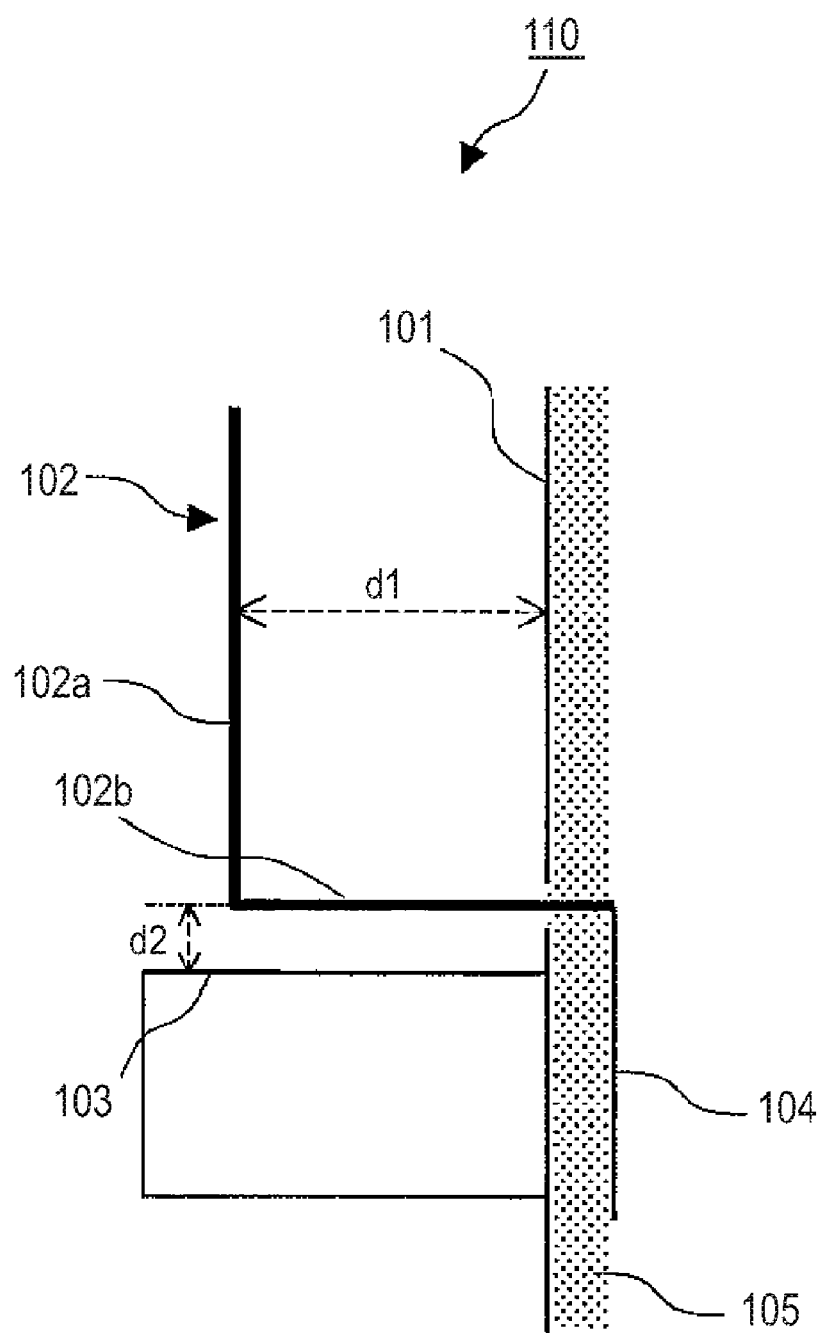
FIG. 3 is a side view of an antenna unit according to the first embodiment regarding the present invention.

The antenna unit 110 of the antenna for radar device 100 is shown in FIG. 3. FIG. 3 is a side view from the right side viewpoint regarding any one of eight pairs of the antenna units 110 as shown in FIG. 1. Moreover, the antenna element 102 is formed to be as an antenna of linear shape, which is bent as L-shaped, one end thereof is opened, another end thereof penetrates the first bottom board 101 as noncontact therewith, and is connected to the transmission line 104 with further penetrating the line substrate 105.

Moreover, the open end side is arranged to be parallel to the first bottom board 101, and then such the part is referred to as a radiation part 102*a* hereinafter. Further, a part at a side connected to the transmission line 104 of the antenna element 102 is arranged to be parallel to the second bottom board 103, and then such the part is referred to as a power feeding part 102*b* hereinafter.

According to the antenna for radar device 100 regarding the present embodiment, a basic function of an antenna element as a radar device is realized for widening the coverage available for angle measuring in a horizontal direction, based on a dipole antenna having a non-directionality in principle, and then by modifying it for having a directionality toward a rear side thereof. Here, an operation of the antenna element 102 according to the present embodiment will be described in detail below, using a pattern diagram regarding an antenna shape as shown in FIG. 4.

Figure 4A:
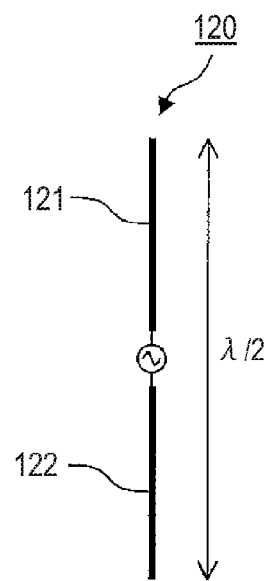
FIG. 4 is a pattern diagram of an antenna formed by modifying a dipole antenna.

FIG. 4A is a pattern diagram showing a dipole antenna. As a wavelength of a transmitted or received electric wave is assumed to be λ, a dipole antenna 120 is configured by arranging in one straight line regarding antenna elements 121 and 122 individually comprised of a linear conductor having a length of approximately λ/4, and then a total length of the dipole antenna 120 becomes to be approximately λ/2 (a half-wave dipole antenna). Moreover, a radiation pattern of such the dipole antenna 120 is formed in a doughnut manner in a direction vertical to the dipole antenna 120 as a center. Thus, the dipole antenna 120 forms the radiation pattern having no directionality on a plane vertical thereto.

Figure 4B:
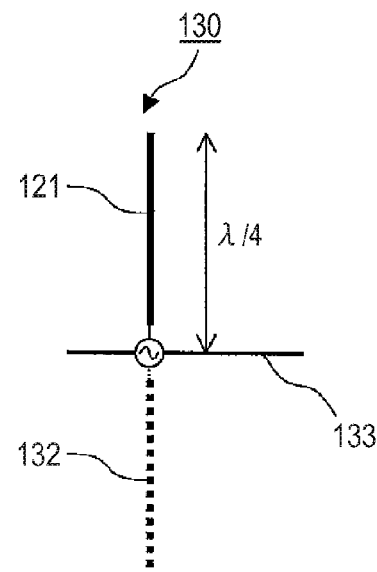

Next, a pattern diagram of a monopole antenna is shown in FIG. 4B. A monopole antenna 130 is an antenna with using only one antenna element (the item 121 for example) in the dipole antenna 120, and then a bottom board 133 is arranged to be orthogonal to the antenna element 121. Hence, a mirror image 132 of the antenna element 121 is formed thereby, and then it becomes possible to obtain antenna characteristics almost equivalent to that of the dipole antenna 120. Therefore, the monopole antenna 130 as shown in FIG. 4B forms the radiation pattern having no directionality on a horizontal plane, as similar to that regarding the dipole antenna 120. Moreover, a total length of the monopole antenna 130 is approximately λ/4 (a quarter-wave monopole antenna). Thus, it has advantages that a height thereof becomes to be half of the dipole antenna 120, and then it becomes possible to design a miniaturization therefor.

Figure 4C:
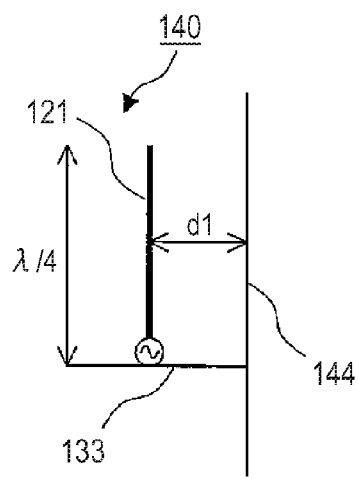

For a radar device to be mounted on a vehicle and then such as for detecting an obstacle or the like at a rear side thereof, it becomes required therefor to have a directionality that an electric wave is radiated only toward the rear side of the vehicle (an opposite direction against a running direction thereof) without radiating toward a front side thereof. Here, the monopole antenna 130 is shown in FIG. 4C for having a directionality toward the rear side, wherein another bottom board 144 is provided with spacing a predetermined distance (assumed to be d1) from and parallel to the antenna elements 121. In such the case, it is important that the bottom board 133 and the bottom board 144 are electrically connected therebetween. If the bottom board 133 and the bottom board 144 are not to be electrically connected therebetween, a notch (a rapid decrease in gain) cannot help but appear on a radiation pattern unidirectional in a horizontal plane.

Here, by providing the bottom board 144, it becomes possible to stop radiating in the radiation pattern toward the front side from the bottom board 144 as being reflected thereby, which is formed in the doughnut manner centering around the antenna 121. As a result, it becomes possible to obtain antenna characteristics having the directionality toward the rear side thereof, by using the monopole antenna. Thus, the bottom board 144 functions as a reflector to reflect an electric wave, and then an antenna 140 as shown in FIG. 4C is referred to as a reflector added monopole antenna hereinafter.

Moreover, in a case where the reflector added monopole antenna 140 as shown in FIG. 4C is used for an antenna for radar device according to the first embodiment regarding the present invention as corresponding to the antenna unit 110 provided in the antenna for radar device 100 according to the first embodiment as shown in FIG. 1, the bottom board 144 of the reflector added monopole antenna 140 becomes to correspond to the first bottom board 101 of the antenna for radar device 100 as shown in FIG. 1, and the bottom board 133 becomes to correspond to the second bottom board 103 therein.

According to the antenna for radar device regarding the above mentioned second embodiment wherein the reflector added monopole antenna 140 is used for the antenna unit, it is required to perform a power feed to the antenna element 121 from the bottom board 133 as the second bottom board. However, the transmission line 104 is formed at the other surface of the first bottom board 101, and then it is required to add another transmission line for power feeding to the antenna element 121 from the transmission line 104 via the second bottom board 103 (the bottom board 133).

Figure 4D:
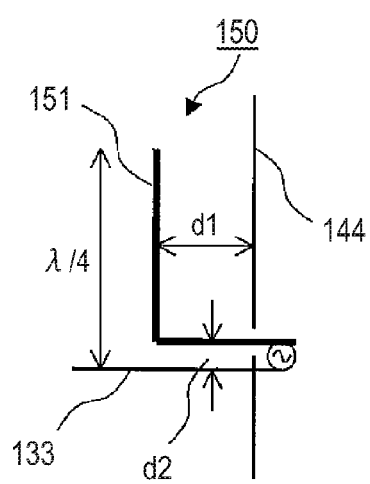

Here, a modified type available for direct power feeding from the transmission line 104 to the antenna element is shown in FIG. 4D. Regarding an antenna element 151 of an antenna 150 as shown in FIG. 4D, the antenna element 121 is bent as ninety degrees toward the bottom board 144 side at a position apart from a predetermined distance (as assumed to be d2) from the bottom board 133, and then the bent part becomes to penetrate to another surface of the bottom board 144 with becoming parallel to the bottom board 133. Thus, it becomes easy to connect the antenna element 151 to the transmission line formed at the other surface of the bottom board 144 thereby.

Here, the antenna for radar device 100 according to the first embodiment is the device wherein the antenna 150 as shown in FIG. 4D is used as the antenna unit 110. A part parallel to the bottom board 144 of the antenna element 151 corresponds to the radiation part 102a as shown in FIG. 3, meanwhile, a part to be bent and parallel to the bottom board 133 corresponds to the power feeding part 102b.

Moreover, it is important for the power feeding part 102b to be formed by setting properly the distance d2 from the second bottom board 103, for being able to transmit a signal of high frequency from the transmission line 104 to the radiation part 102a. That is to say, it becomes possible to perform efficiently power feeding from the transmission line 104 to the radiation part 102a, by forming a transmission line part between the power feeding part 102b and the second bottom board 103, and then by adjusting the distance d2 for an impedance of the transmission line part to be a predetermined amount from a viewpoint of the transmission line 104 side.

Next, the distance d1 between the radiation part 102a and the first bottom board 101 will be described in detail below. As described above, the bottom board 101 has a function as a reflector so as not to radiate an electric wave forward therefrom. Moreover, it influences a large effect onto a radiation pattern from the radiation part 102a, according to the distance d1 from the radiation part 102a.

Regarding the antenna for radar device 100, it is desirable to realize a radiation pattern to be able to obtain a gain of not less than a predetermined amount with a wide angle range (coverage) toward a rear side thereof. Moreover, for obtaining the radiation pattern of high gain with the wide coverage, the distance d1 may be set as the λ/4, or as a preferable value close thereto.

Hereinafter, an azimuth measured using the antenna for radar device 100 is to be designated by an angle change from a direction vertical to the first bottom board 101 as a reference (zero degree). And then in a case where the distance d1 is set as approximately λ/4, it becomes possible to obtain a gain pattern of monomodal, wherein the gain has a peak value at the azimuth of zero degree, and the gain becomes reduced as the azimuth becomes larger to the right and the left sides thereof. Moreover, it becomes possible to change the pattern to be such as a bimodal or the like and then to widen the coverage, by shifting the distance d1 from the λ/4. Thus, it becomes possible to obtain a wider coverage by setting the distance d1 to be as the λ/4 or close thereto. And then for example, it becomes possible to realize a coverage of not less than ±50 degrees with using a beam width of 3 dB.

Next, an arrangement of the antenna unit 110 will be described in detail below. According to the monopulse method, based on signal values measured at two different positions in a horizontal direction, an azimuth is measured by calculating a sum signal of such the both values and a difference signal therebetween. Moreover, a directionality of an array antenna using the phase comparison monopulse method depends on the directionality of the antenna itself and the directionality of an array of the antenna elements. And then a combined directionality of such the both directionalities is determined by the following equation:

(Combined directionality)=(Directionality of antenna element)×(Directionality of array of nondirectional point radiation source).

Here, according to the antenna for radar device 100, the directionality of the antenna element 102 itself becomes to be wider by using the antenna unit 110 having the structure as shown in FIG. 3. In addition thereto, for widening the directionality of an array of the antenna elements 102, the antenna units 110 of not less than one (four in FIG. 1) are arrayed to be one array in a similar straight line for (in a direction vertical to) the antenna elements 102. And then the antenna elements 102 (and the antenna units 110) are arranged for satisfying D/λ<0.5 as a distance between arrays in a horizontal direction is assumed to be D as shown in FIG. 1.

According to the present embodiment, a directional property of the array is prevented from being zero in the range of ±90 degrees by setting the distance D between the antenna elements 102 for satisfying D/λ<0.5. Next, the directional property of the array will be described in detail below using FIG. 5. FIG. 5 shows one example for a receiving pattern of an antenna element as a single piece with a symbol 10, one example for a sum signal (defined as L) and a difference signal (defined as Δ) of two array antennas with symbols 20 and 30 respectively, with a vertical axis as a reception level (dB) and a horizontal axis as an angle from a direction vertical to a plane of the antenna. Here, the beam width of the antenna element as the single piece is assumed to be as 108 degrees.

Figure 5A:
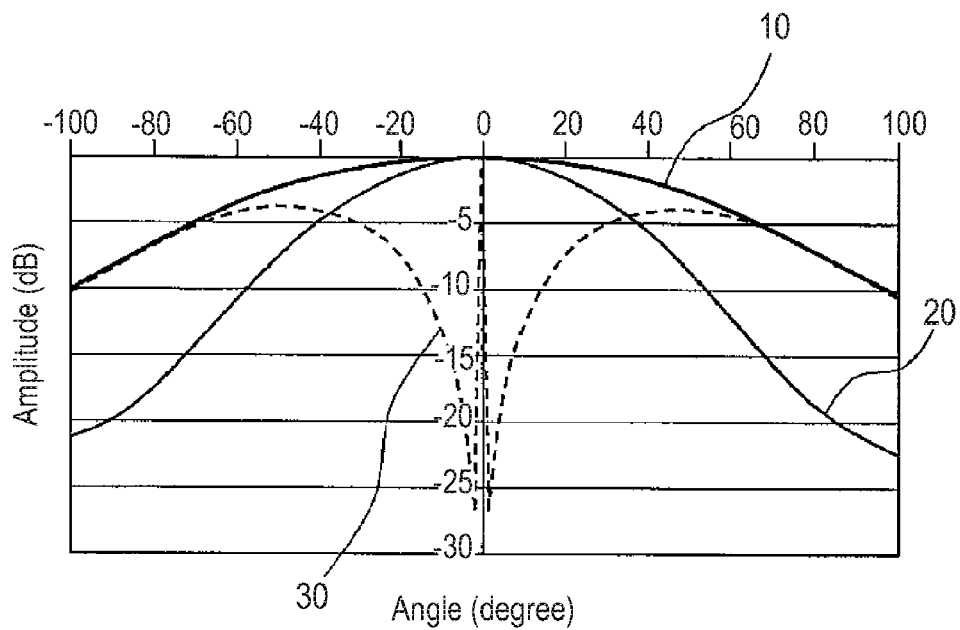
FIG. 5 is a graph showing one example of individual receiving patterns of an antenna element as a single piece, a sum signal of the antenna element and a difference signal thereof respectively.
Figure 5B:
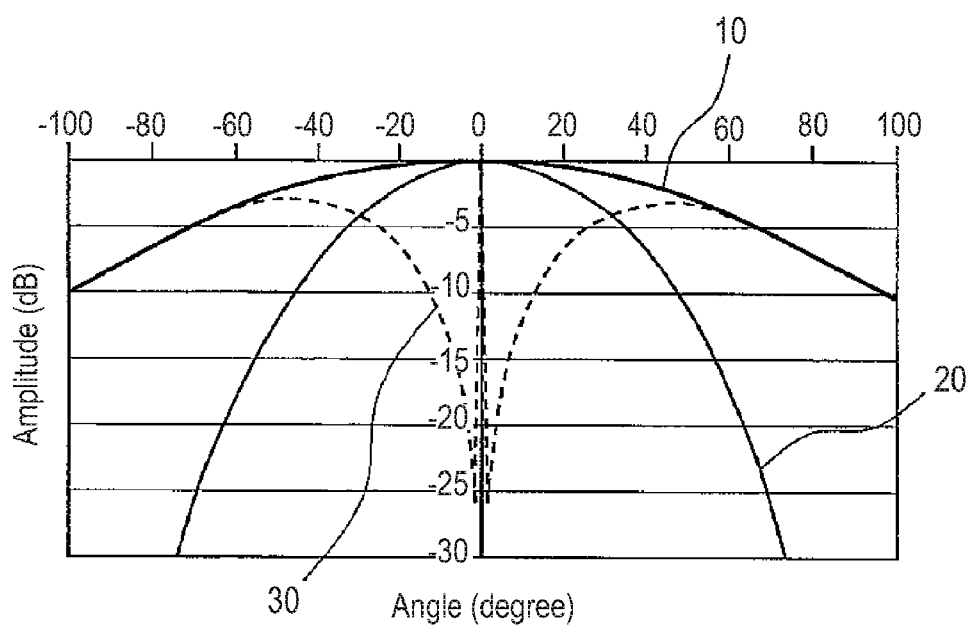

In FIGS. 5A and B, an amount of the distance D between the antenna elements 102 is changed therebetween, wherein it is defined as D/λ=0.42 in FIG. 5A, meanwhile, it is defined as D/λ=0.5 in FIG. 5B. In the case of FIG. 5A as D/λ=0.42 for the distance D between the antenna elements 102 to be smaller, the reception level of the sum signal 20 shows a tendency to be gradually reduced from zero degree as a center to ±90 degrees or more. On the contrary, in the case of FIG. 5B as 5D/λ=0.5, the reception level of the sum signal 20 is rapidly reduced as drawing nearer to ±90 degrees.

Moreover, according to the phase comparison monopulse method, the angle is evaluated by using the value (Δ/Σ) as the difference signal 30 is divided by the sum signal 20. However, when the reception level of the sum signal 20 draws nearer to zero, the value (Δ/Σ) becomes rapidly increased, and then it cannot help but become unable to evaluate the angle. This is because the angle cannot help but become to be included within the range of ±90 degrees, which becomes to be zero due to an interference between receiving signals of two array antennas. Therefore, according to the antenna for radar device 100 regarding the present embodiment, the antenna element 102 is arranged for satisfying D/λ<0.5. Thus, there becomes no case thereby for the sum signal Σ to be zero within the range of ±90 degrees. And then it becomes possible to perform an angle measurement over a wide angle range within ±90 degrees.

The Second Embodiment

Figure 6:
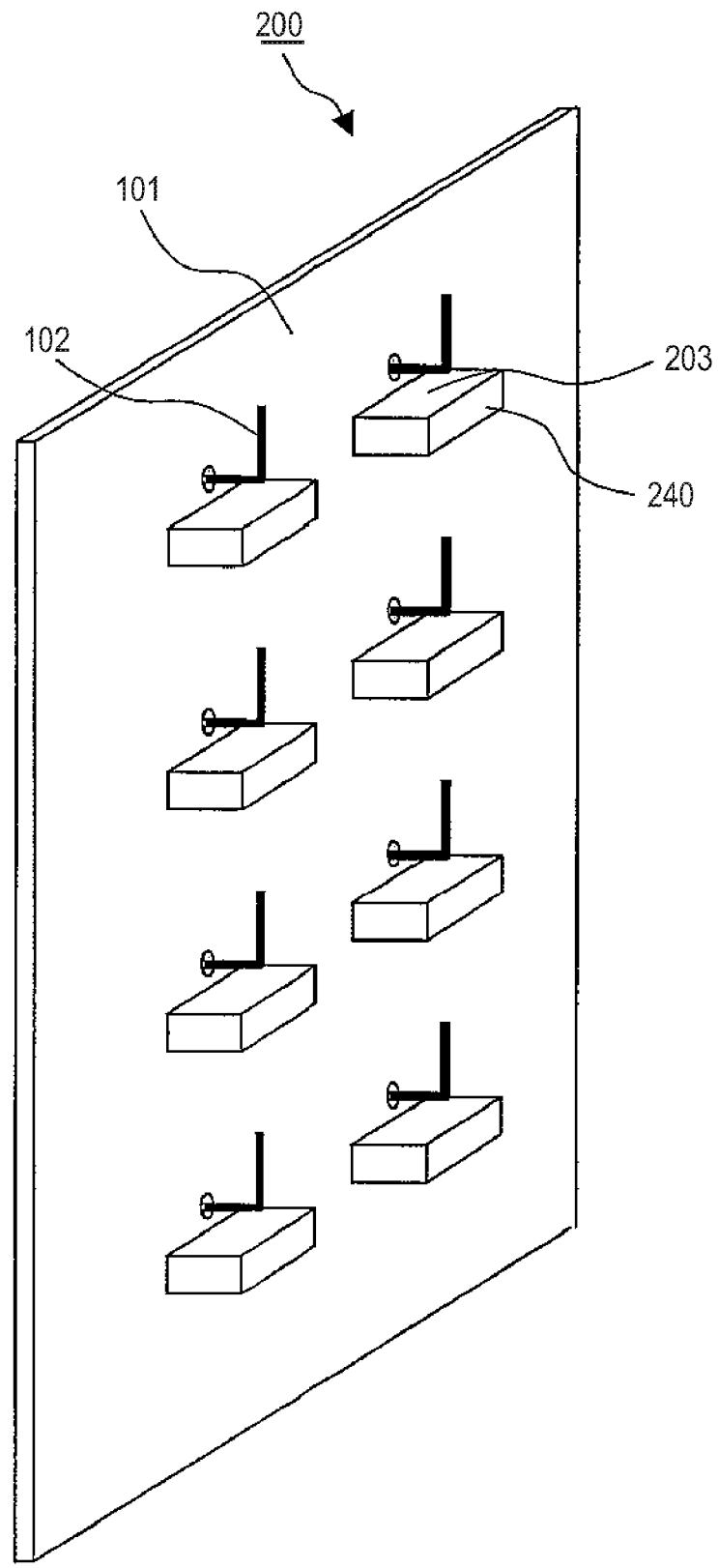
FIG. 6 is a diagrammatic perspective view of an antenna for a radar device according to another embodiment regarding the present invention.

Another embodiment regarding the antenna for radar device according to the present invention will be described in detail below. According to the antenna for radar device 100 as shown in FIG. 1, the shape of the second bottom board 103 is the curved surface formed on the round column. However, the shape is not limited thereto, and a second bottom board of planar shape may be formed as well, using such as a rectangular column. And then an antenna for radar device 200 according to another embodiment is shown in FIG. 6, wherein such the second bottom board of planar shape is formed on a rectangular column. In the figure, a second bottom board 203 of planar shape is formed on the rectangular column 240.

The Third Embodiment

Figure 7:
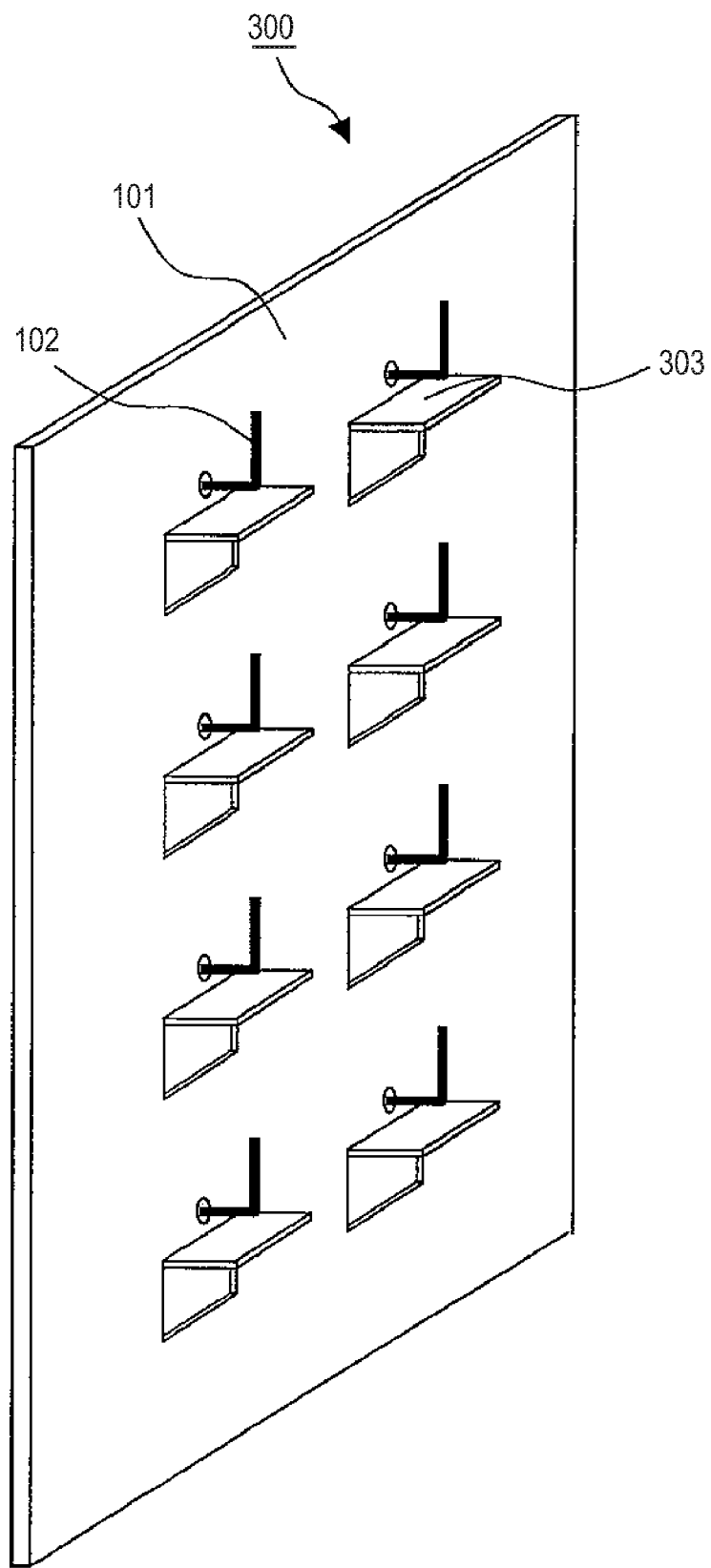
FIG. 7 is a diagrammatic perspective view of an antenna for a radar device according to further another embodiment regarding the present invention.

As a further embodiment, an antenna for radar device 300 is shown in FIG. 7, wherein any round column or any rectangular column is not used, but a part of the first bottom board 101 is cut and raised to be a second bottom board. In the figure, a part of the first bottom board 101 is cut and raised, and then it is to be a second bottom board 303.

Further, a length of the second bottom board 103 in a direction vertical to the first bottom board 101, that is to say, a height of the second bottom board 103 from the first bottom board 101 as a bottom face, is determined for the angle range to be a predetermined amount, which is available for measuring on a plane vertical to the first bottom board 101 and including the antenna element 102 (that is to say, on the plane in the direction of the upper and the lower sides in FIG. 1).

Figure 8:
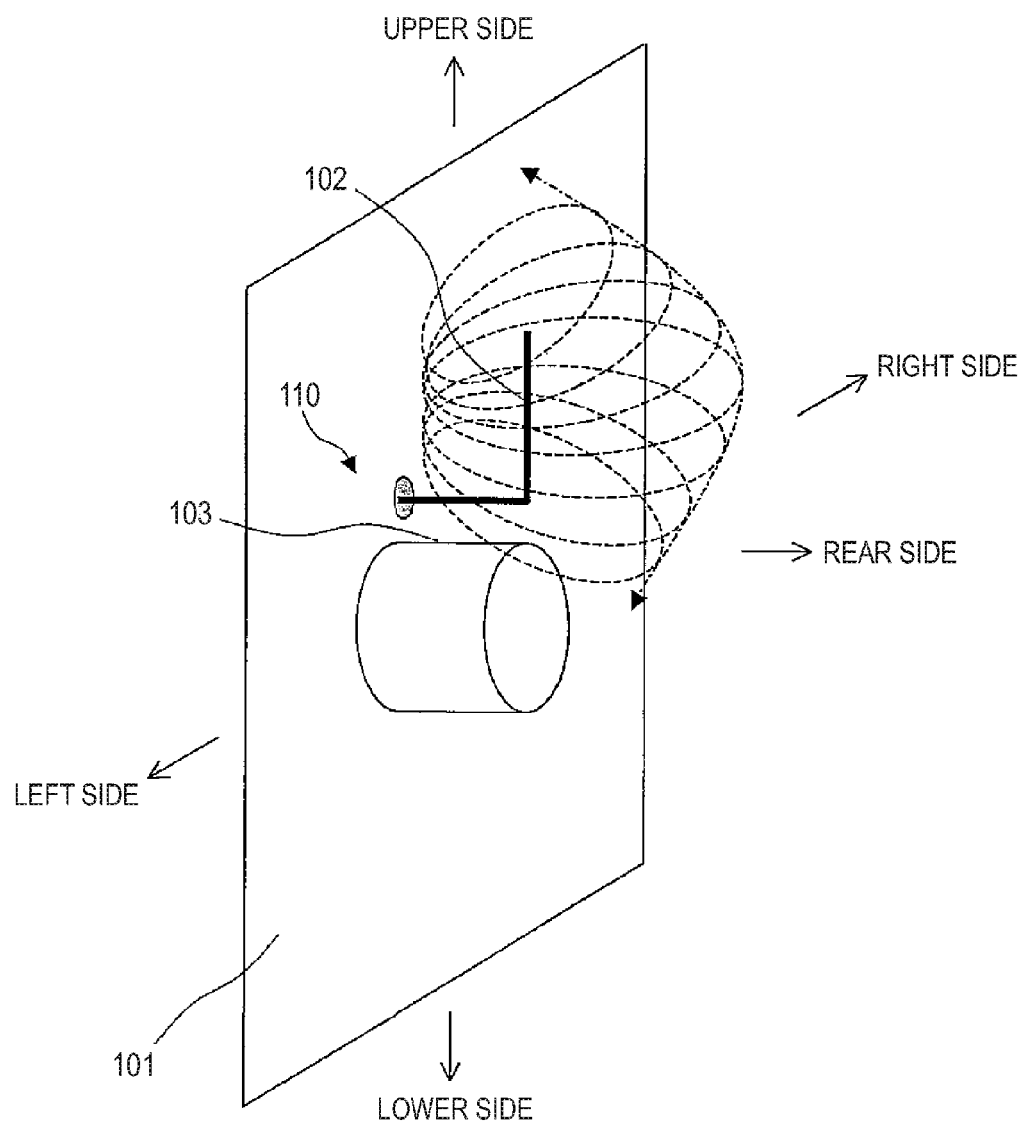
FIG. 8 is a pattern diagram showing an influence onto a radiation pattern affected by a height of a second bottom board.

Still further, an influence that the height of the second bottom board 103 effects onto the radiation pattern is exemplary shown in FIG. 8. Here, the height of the second bottom board 103 influences on a spread of the radiation pattern in the direction of the lower side in the figure. And then there may be a probability that it becomes unable to perform a measurement for the rear and the lower sides in a case where the second bottom board 103 becomes to be excessively high. Therefore, the height of the second bottom board 103 may be determined, for performing preferably the measurement of the rear and the lower sides within a desirable angle range.

Furthermore, according to the antenna for radar device 100 as shown in FIG. 1, the direction of the upper and the lower sides are determined and used, for the second bottom board 103 to be the lower side of the antenna element 102. However, as opposite thereto, it is possible to use the antenna for radar device 100 as shown in FIG. 1 as well, with reversing the upper and the lower sides thereof. In such the case, it becomes possible to suppress a radiation toward the upper side thereof as well, by raising the height of the second bottom board 103.

The Fourth Embodiment

Figure 9A:
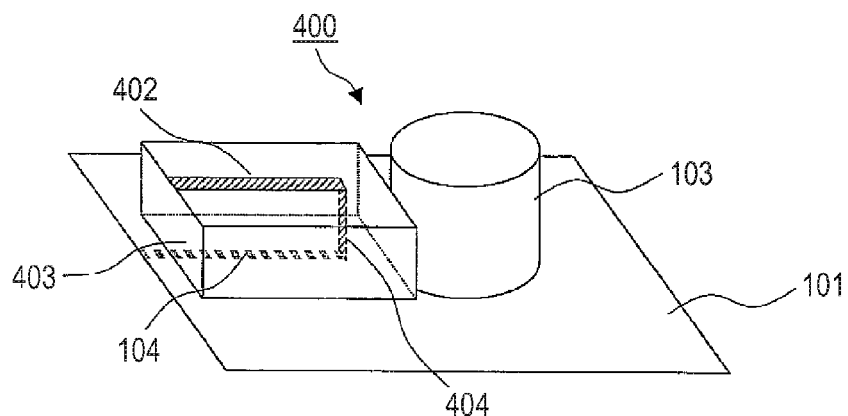
FIG. 9 is a diagrammatic perspective view of an antenna for a radar device according to further another embodiment regarding the present invention.

For another embodiment regarding the antenna for radar device according to the present invention will be described in detail below using FIG. 9. According to the above described each of the embodiments, the antenna element 102 is used, wherein a conductor of linear shape is lanyard arranged in the air. However, it is not limited thereto, and it is possible to comprise an antenna unit 400 using a printed antenna element 402 as shown in FIG. 9A for example. Such a printed antenna element 402 is formed by being printed on one surface side of a dielectric substance 403 mounted and set on the first bottom board 101. Moreover, a metallic conductor 404 is formed between the printed antenna element 402 and the transmission line 104 formed on the other surface of the first bottom board 101, and then a power feed is performed via such the conductor. Further, the metallic conductor 404 may be a through hole as well.

Figure 9B:
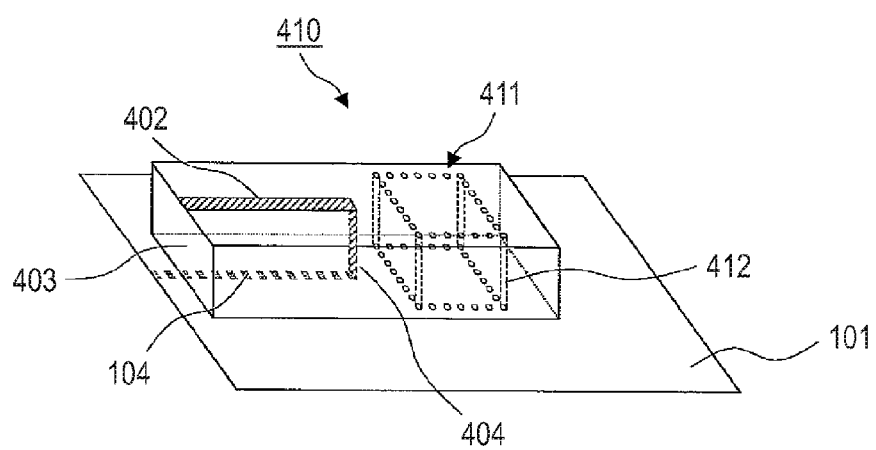

Still further, it is also possible to comprise further another antenna unit 410, by forming another second bottom board on the dielectric substance 403, in place of the second bottom board 103. In FIG. 9B, the dielectric substance 403 is enlarged to the place where the second bottom board 103 was arranged, and then a plurality of through holes 412 are formed on the arrangement position of the second bottom board 103. Still further, a second bottom board 411 is formed by arraying a plurality of the through holes 412. Such the through hole 412 is provided with standing in a direction approximately vertical to the first bottom board 101, and then it is electrically connected to the first bottom board 101. Here, a plurality of the through holes 412 are arrayed in a rectangular manner according to FIG. 9B. However, it is possible to select properly an array shape therefor. For example, it may be arrayed in a circular manner as well, as similar to that for the second bottom board 103.

Figure 9C:
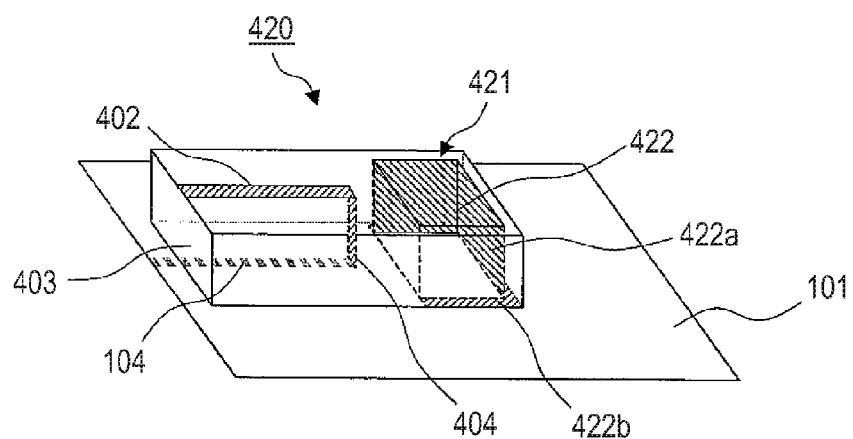
Figure 10:
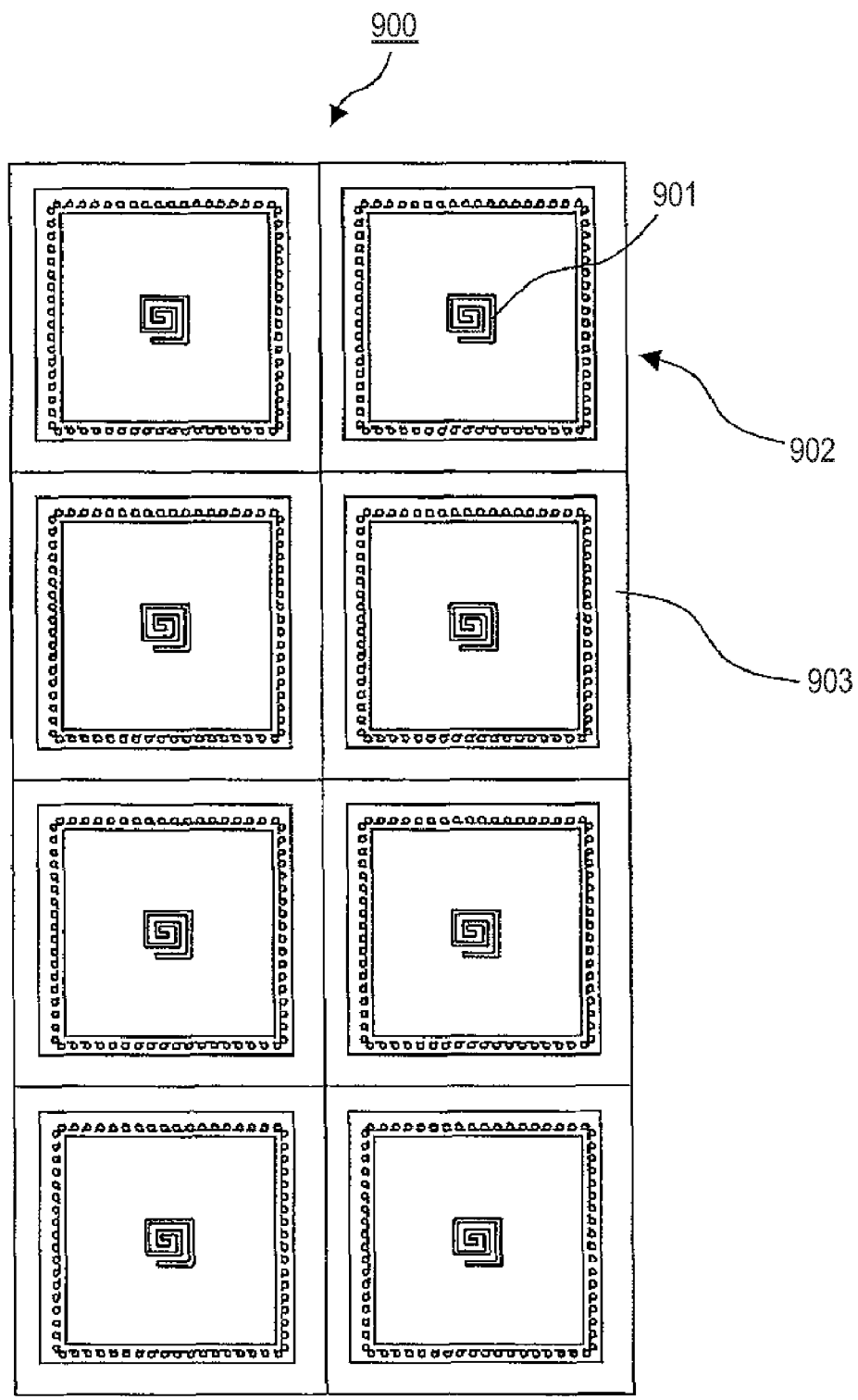
FIG. 10 is a plan view showing a conventional antenna for a radar device.

Furthermore, FIG. 9C shows another antenna unit 420 according to the present invention, wherein a second bottom board is different from others. A second bottom board 421 as shown in FIG. 9C forms a penetrated part 422 at a part of the dielectric substance 403, and then there is performed a metal plating on a side surface 422a of the penetrated part 422 and on a surface 422b contacting with the first bottom board 101. Thus, the second bottom board 421 is formed by using such the side surface 422a performed the metal plating thereon.

Here, the description regarding the present embodiment is described for one example of the antenna for radar device according to the present invention, and it is not limited thereto. Regarding a detailed configuration, a detailed operation, or the like, according to the antenna for radar device regarding the present embodiment, it is possible to modify properly without departing from the subject of the present invention.

The invention claimed is:

1. An antenna for radar device comprising:
a first bottom board having a planar shape;
a second bottom board to be electrically conducted on a surface of one side of the first bottom board and to be provided with standing in a direction approximately vertical thereto; and
an antenna element having a linear shape arranged in a direction parallel to the first bottom board with spacing a predetermined distance of d1 therefrom, and arranged at a predetermined position to be approximately vertical to the second bottom board,
wherein it is formed with a length between the second bottom board and a tip of the antenna element to be approximately a $\lambda/4$ in a case where a wavelength of a transmitting and receiving electric wave is assumed as $\lambda$.

2. The antenna for radar device according to claim 1, wherein the antenna element and the second bottom board form one unit, two of the antennas individually comprised of the one unite are arrayed on a similar plane or a similar curved surface of the first bottom board, and a $D/\lambda<0.5$ in a case where a distance between the two antennas is assumed as D.

3. The antenna for radar device according to claim 2, wherein a plurality of the one units are arranged to be an array form.

4. The antenna for radar device according to claim 2, wherein a transmission line is provided at another surface of the first bottom board, and the antenna element is connected to the transmission line with being bent toward the first bottom board side to be in a direction parallel thereto in a vicinity of the second bottom board.

5. The antenna for radar device according to claim 2, wherein a transmission line is provided at the second bottom board side, and the antenna element is connected to the transmission line.

6. The antenna for radar device according to claim 2, wherein the distance d1 is approximately equal to the $\lambda/4$.

7. The antenna for radar device according to claim 2, wherein the second bottom board has a planar shape or a curved surface to be provided with standing in a direction approximately vertical onto the first bottom board.

8. The antenna for radar device according to claim 1, wherein a transmission line is provided at another surface of the first bottom board, and the antenna element is connected to the transmission line with being bent toward the first bottom board side to be in a direction parallel thereto in a vicinity of the second bottom board.

9. The antenna for radar device according to claim 1, wherein a transmission line is provided at the second bottom board side, and the antenna element is connected to the transmission line.

10. The antenna for radar device according to claim 1, wherein the distance d1 is approximately equal to the λ/4.

11. The antenna for radar device according to claim 10, wherein the antenna element is formed by being printed on a top surface of a dielectric substance mounted and set on the first bottom board.

12. The antenna for radar device according to claim 1, wherein the second bottom board has a planar shape or a curved surface to be provided with standing in a direction approximately vertical onto the first bottom board.

13. The antenna for radar device according to claim 1, wherein a height of the second bottom board in the direction approximately vertical to the first bottom board is determined to be available to measure an elevation angle till a predetermined degree for the first bottom board as a horizontal plane on a plane vertical to the first bottom board and including the antenna element.

14. The antenna for radar device according to claim 13, wherein the antenna element is formed by being printed on a top surface of a dielectric substance mounted and set on the first bottom board.

15. The antenna for radar device according to claim 1, wherein the antenna element is formed by being printed on a top surface of a dielectric substance mounted and set on the first bottom board.

16. The antenna for radar device according to claim 15, wherein the antenna element is formed by being printed on the top surface of the dielectric substance mounted and set on the first bottom board, and connected to the transmission line via a through hole formed at the dielectric substance.

17. The antenna for radar device according to claim 16, wherein the second bottom board is formed by arraying a plurality of the through holes in an annular manner with a predetermined space respectively, that penetrate the dielectric substance individually, and are provided with standing in a direction approximately vertical to the first bottom board.

18. The antenna for radar device according to claim 16, wherein the second bottom board is formed by metal plating an inner surface of a hole having an open part at a face side contacting with the first bottom board of the dielectric substance and formed for a side surface thereof to be approximately vertical to the first bottom board.

19. The antenna for radar device according to claim 15, wherein the second bottom board is formed by arraying a plurality of the through holes in an annular manner with a predetermined space respectively, that penetrate the dielectric substance individually, and are provided with standing in a direction approximately vertical to the first bottom board.

20. The antenna for radar device according to claim 15, wherein the second bottom board is formed by metal plating an inner surface of a hole having an open part at a face side contacting with the first bottom board of the dielectric substance and formed for a side surface thereof to be approximately vertical to the first bottom board.

* * * * *